Nov. 24, 1964   T. F. ANDERSON ETAL   3,158,383
CHASSISLESS TANK TRUCK
Filed Dec. 15, 1961   2 Sheets-Sheet 1
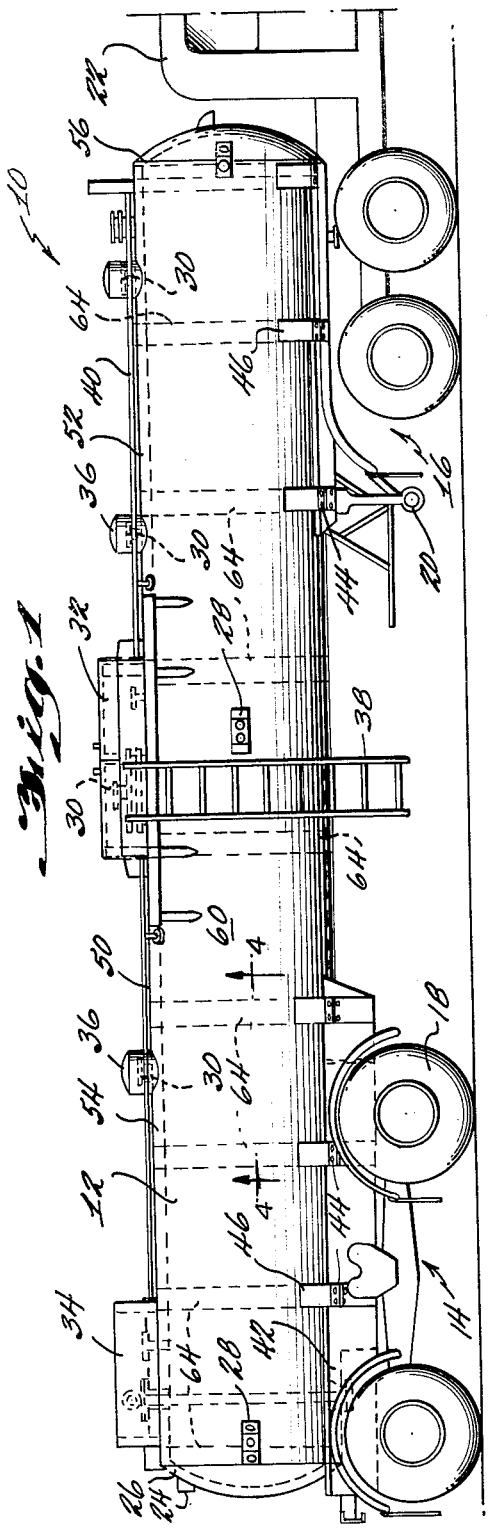
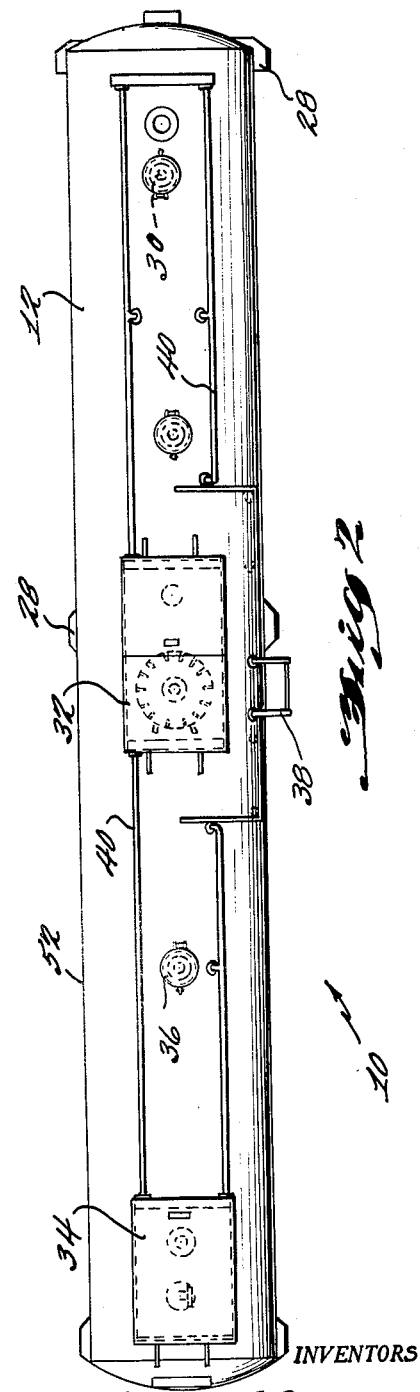
INVENTORS
THOMAS F. ANDERSON
JOHN H. LUX
By Cushman, Darby & Cushman
ATTORNEYS Nov. 24, 1964  T. F. ANDERSON ET AL  3,158,383
CHASSISLESS TANK TRUCK
Filed Dec. 15, 1961  2 Sheets-Sheet 2
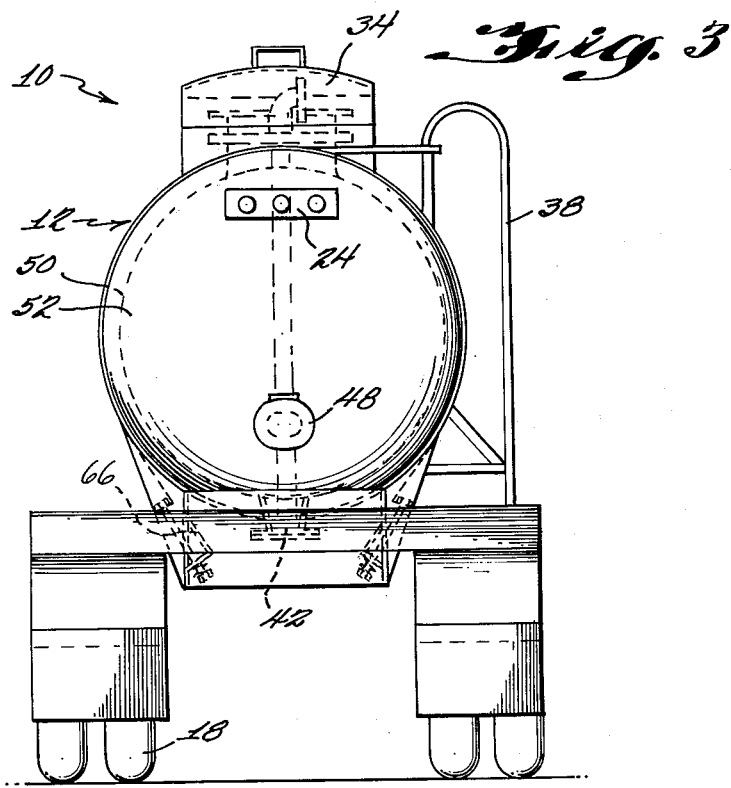
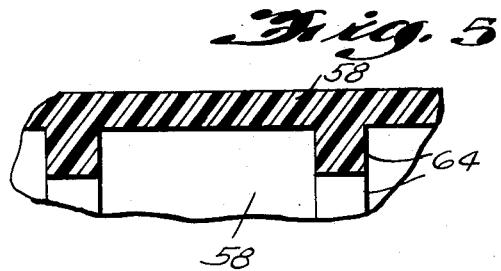
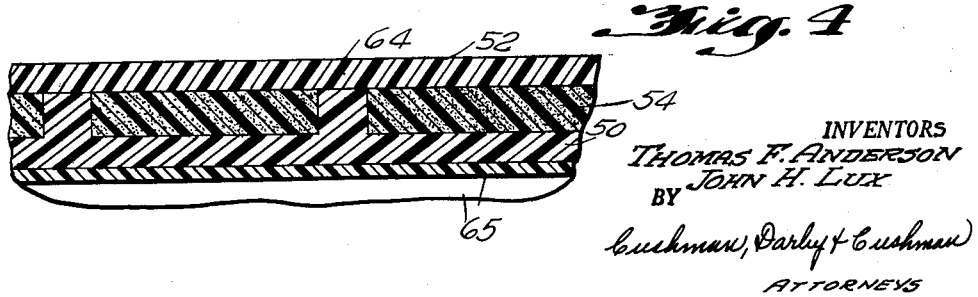
INVENTORS
THOMAS F. ANDERSON
JOHN H. LUX
BY
Cushman, Darby & Cushman
ATTORNEYS

United States Patent Office 3,158,383
Patented Nov. 24, 1964

3,158,383
CHASSISLESS TANK TRUCK
Thomas F. Anderson, Wilmington, Del., and John H. Lux, Charlestown, Md., assignors to Haveg Industries, Inc., Wilmington, Del., a corporation of Delaware
Filed Dec. 15, 1961, Ser. No. 162,632
8 Claims. (Cl. 280—5)

This invention relates generally to a chassisless tank trailer and, more specifically, to an improved tank trailer of plastic shell construction.

While tank trailers have been known and used for many years, generally they have been of steel construction and more recently have been made of aluminum. As a result, these trailers were costly due to the fabrication problems involved and required a substantial amount of maintenance.

An object of the present invention is to provide a chassisless tank trailer of extremely lightweight construction with resultant increased pay-load for the carrier.

Another object is to produce a corrosion resistant tank trailer.

A further object is to produce a tank trailer which protects inflammable contents.

These objects are attained by utilizing as the tank trailer of the present invention one which includes a fiber glass reinforced plastic shell and is chassisless. Usually it is supported upon a pair of spaced-apart rolling cradles. The cost of fabricating such a plastic shell tank is greatly reduced compared with its present counterpart having metal channels between cradles and therefore results in a less costly product initially. Furthermore, the cost of maintaining such a trailer is greatly decreased from that of an all-metal trailer.

A trailer of plastic construction as contemplated herein has a relatively low weight to strength ratio which permits increased loads thereby reducing shipping costs considerably. Also, trailers of plastic shell construction can be produced which are corrosion resistant and therefore require no special liner in order to handle highly corrosive materials. The fiber glass reinforced plastic trailers have the advantages of high impact strength together with a low coefficient of heat transfer. Such a construction particularly when including a foamed plastic insulation, is especially useful for purposes of safety when carrying inflammable chemicals, e.g., petroleum products on the highway. Comparison tests between aluminum tanks and plastic shell vessels of the construction herein described have indicated the latter to afford a much higher degree of fire resistance for the contents of the vessels.

The tanks prescribed herein are extremely versatile being able to carry a variety of food products, e.g., milk, corn syrup, vinegar and soups, chemicals, including gasoline and other petroleum products. Since the tanks are corrosion resistant, they can be used to carry products as diverse as hydrofluoric acid, acidic fluoride salts, sulfuric acid, sodium hydroxide, formaldehyde, bleach solution, hydrochloric acid, sodium hypochlorite and ammonium nitrate.

In an especially preferred form of the invention, the inner shell is of unitary construction, i.e., no adhesives are required to unite separate panels and, hence, the danger of attack by chemicals is reduced.

Other and further objects of this invention will become more apparent in the description which follows when taken with the accompanying drawings in which like numerals refer to like parts throughout.

In the drawings:

FIGURE 1 is a side elevation view of the chassisless tank trailer of this invention embodying a fiber glass reinforced plastic shell construction;

FIGURE 2 is a top plan view of a trailer illustrated in FIGURE 1;

FIGURE 3 is a rear elevation view of a tank trailer illustrated in FIGURES 1 and 2;

FIGURE 4 is a longitudinal sectional view taken on the line 4—4 of FIGURE 1; and FIGURE 5 is a view similar to that shown in FIGURE 4 illustrating the shell construction of a different form of tank.

The tank trailer which forms the present invention is generally indicated at 10 and comprises a tank member 12 which is of elongated, cylindrical form and which is supported upon a pair of cradles 14 and 16. The tank member 12 is of plastic shell construction, the chemical characteristics of which will be described below. The specific tank illustrated in the drawings is designed to carry 5600 gallons of product but it is to be understood that the invention is applicable to tank trailers of other sizes, e.g., of 1000 gallons to 10,000 gallons capacity.

The rear cradle 14 is illustrated in FIGURE 1 as including a pair of tandem axles which support the wheels 18 thereon. The cradle and axle combination is conveniently sprung to absorb the normal shocks of road travel. At the forward end of the tank trailer, the tank member 12 is likewise supported upon the cradle 16 which includes a pair of castor wheels 20 depending therefrom which serve to support the forward end thereof when detached from the tractor 22. The forward end of the tank trailer is supported upon the aft end of the tractor 22 and is received thereon in such a manner as to be coupled to or uncoupled therefrom at the will of the tractor operator. The tractor 22 illustrated in FIGURE 1 is shown to include a pair of axles in tandem, each of which carries at least one pair of wheels. However, it will be understood that the cradle 16 might be adapted to mount an axle which will cooperate with the driving axle of the tractor, and that such a construction will remain within the scope of the present invention.

The trailer envisoned herein includes the normal appurtenances found on conventional tank trailers. More specifically, the trailer of the present invention includes a cluster lightbox 24 which is mounted in the rear dome 26 of the tank member 12, and lights and reflectors, as indicated at 28, are stationed at various intervals along the side of the member. A number of nozzles 30 are mounted at a plurality of locations on the top side of the member 12 and serve as access ports for filling the tank member. In the central portion and at the aft portion of the tank member 12 are located quick-opening manholes 32 and 34 for easy access to the nozzles contained within their confines. The remaining nozzles have somewhat smaller covers 36 which serve to protect their associated nozzles from the elements.

A stepladder 38 depends from the side of the tank member and provides access from the ground to the upper parts of the trailer for purposes of maintenance and filling of the tank. Also, guard rails 40 are provided for the safety of the workmen.

A drain nozzle 42 is provided at the rear of the tank member in the bottommost portion thereof for suitably discharging the contents of the trailer. Each of the cradles or frames 14 and 16 includes a number of flange members 44 to which are attached straps 46 of fiber glass reinforced plastic or metal construction and which engage and circumscribe the periphery of the tank member 12. The straps 46 may be secured to the flange members 44 by means of bolts or other known securing means. The frames as indicated are bolted into the tank 12 as indicated where ribs 64 occur. The importance of the ribs will be explained in detail below. Also mounted in the rear dome 26 of the tank member 12 is a dial thermometer 48 for indicating the temperature of the contents of the trailer. The tank or portions thereof can be translucent, e.g., by omitting the pigment from the plastic impregnated fiber glass shell so that the level of the contents can be measured without the need for a sight glass.

There can be supplied tie down straps 66 on the outside of the tank, although such straps are not essential and usually are not employed.

As can be seen best in FIGURE 3, the tank sits within the framework (or cradles) to which the wheels are attached.

With the physical description of the tank trailer thus completed, the chemical form and composition of the tank member 12 will now be described with particular reference to FIGURES 4 and 5.

The tank member 12, as shown in FIGURES 1, 3 and 4, comprises an inner corrosion resistant plastic shell 50, an outer shell 52 of high strength fiber glass reinforced plastic and an annulus 54 between the inner and outer shell filled with a foamed insulation.

As previously indicated, there are provided a plurality of ribs 64 which are an integral part of the inside shell 50. These ribs are in the form of rings which are built up on the exterior of the inner shell and are of the same thickness as the insulation so that they engage the outer shell 52. The outer shell is laid over the ribs and bonded thereto, e.g., by fusion prior to or during the curing of the resin. There is no need to employ adhesives. This gives a stressed skin construction and imparts rigidity and stability to the system. The ribs are essential not only to bond the inner shell to the outer shell but to keep the tank in cylindrical form. Without the ribs it would not be possible to make a chassisless tank which would have sufficient strength to carry a payload of 1000 gallons or over.

It is important that the cradles 14 and 16 be bolted or otherwise fixed to the tank where the ribs occur in order to insure a strong securing of the tank to the cradles.

When the tank is designed for pressure unloading, it should be of generally cylindrical shape. The tank can be of elliptical shape when other forms of unloading are employed.

In the illustrative example, there are 9 rings or ribs provided. This number will vary with the size of the tank. While some reinforcement is obtained with two ribs, generally four or more ribs will be employed. By employing the ribs, the advantage of thin wall plastic construction with its attendant light weight is obtained along with the requisite strength.

In a specific example, the shell 50 is made of high strength polyester impregnated fiber glass, the polyester being a styrene modified polyethylene glycol-polypropylene glycol-adipate-maleate, the annulus 54 is filled with a polyurethane foam, e.g., a foam made from the reaction product of toluene diisocyanate and the propylene oxide-glycerine adduct of molecular weight 3000 (commercially available as LG-56) and the outer shell 52 is an epoxy resin impregnated fiber glass, the epoxy resin being the reaction product of bisphenol A and epichlorhydrin. The various appurtenances such as the walls of the manholes 32 and 34 and cover 36 can be made of the same plastics as the shells 50 and 52.

The shells 50 and 52 can be of the same or of different plastic construction. It is essential that at least one of them, and preferably the outer shell, be a fiber glass reinforced plastic. It is also critical that the ribs 64 be provided for.

The fiber glass can be impregnated with a wide variety of resins. Thus there can be used unsaturated polyester resins made from a linear unsaturated polyester and a polymerizable ethylenically unsaturated monomer which is polymerized along with the completion of the cure of the polyester. The polyester can be made from glycols such as ethylene glycol, diethylene glycol, propylene glycol, dipropylene glycol, 2,3-butanediol, 1,3-butanediol, tetrachlorobutanediol-1,4, trimethylene glycol and unsaturated dibasic acids (and their anhydrides if available) such as maleic acid, fumaric acid, cis-3,6-endomethylene-delta$^4$-tetrahydrophthalic acid, itaconic acid and citraconic acid. A portion of the unsaturated acid can be replaced by saturated aliphatic or aromatic polycarboxylic acids such as succinic acid, adipic acid, sebacic acid, azelaic acid, phthalic acid, tetrachlorophthalic acid, trimesic acid, hemimellitic acid, and citric acid. The use of Hetron resins (polyesters made from hexachloroendomethylene tetrahydrophthalic acid) and any of the above mentioned glycols are particularly useful. As the vinyl or vinylidene monomer, there can be used styrene, the vinyl toluenes, e.g., o-vinyl toluene, alpha-methyl styrene, triallyl cyanurate, diallyl phthalate, methyl methacrylate, ethylene glycol dimethacrylate, vinyl acetate, o-chlorostyrene, 3,5-dichlorostyrene. When the resin forming components have halogen atoms attached to the molecule, increased fire resistance is imparted to the plastic shell. Illustrative examples of suitable unsaturated polyester resins in addition to those set forth above are found in Sergovic Patent 2,751,775.

As indicated, the fiber glass can be impregnated with epoxy resins. Generally such resins should have a 1,2-epoxy equivalency greater than one. Thus, there can be used the glycidyl polyethers of polyhydric phenols and polyhydric alcohols such as resorcinal, catechol, bisphenol A, 4,4'-dihydroxybenzophenol, bis (4-hydroxyphenyl), 1,1-isobutane, novolac resins having 3 to 7 phenolic groups, 1,5-dihydroxy naphthalene, ethylene glycol, glycerine, propylene glycol, diethylene glycol, dipropylene glycol, mannitol, sorbitol, pentaerythritol, polyallyl alcohol and polyvinyl alcohol. Typical examples of suitable epoxy resins are set forth in U.S. Patents 2,528,417 and 2,500,449. There can also be used epoxy resins made from allyl glycidyl ether, glycidyl methacrylate, 1,4-butane diepoxide and the like.

Furthermore, the fiber glass can be impregnated with a vinyl chloride resin or, more preferably, with a mixture of a thermosetting resin such as an epoxy resin (e.g., bisphenol A-epichlorhydrin), and the vinyl chloride resin, polyurethanes, e.g. the reaction product of an organic polyisocyanate such as toluene diisocyanate, phenylene diisocyanate, naphthalene diisocyanate and hexamethylene diisocyanate with a polyhydric alcohol or polyester having free hydroxyl groups. Specific examples of such polyurethanes are made by reacting toluene diisocyanate (a mixture of 80% of the 2,4 isomer with 20% of 2,6 isomer) with a polyester such as an ethylene glycol-adipate having a hydroxyl number of about 440 and an acid number of about 1.5, or with a polyhydric alcohol such as LG-56, polypropylene glycol having a molecular weight of 2025, 1,2,6-hexane triol-propylene oxide adduct molecular weight 1000, tris polypropylene glycol 2025 phosphite, tris dipropylene glycol phosphite, a mixture of polypropylene glycol 2025 and tris dipropylene glycol phosphite, etc. The polyurethanes containing phosphorus in the molecule have the additional advantage of improved fire and flame resistance.

The fiber glass can also be impregnated with thermosetting resins such as the phenolic resins, e.g., phenol-formaldehyde, cresol-formaldehyde, phenol-furfural, xylenol-formaldehyde, resorcinol-formaldehyde as well as other thermosetting resins like the aminotriazine-aldehyde resins, e.g., melamine-formaldehyde, urea-formaldehyde, furfuryl alcohol resin, furfural resins, triallyl cyanurate, diethylene glycol bisallyl carbonate and diallyl phthalate resins.

The fiber glass can also be impregnated with polystyrene, polyethylene, polypropylene, resinous polyoxymethylene (Delrin), polycarbonates, e.g., bisphenol A polycarbonate (made by reacting diphenyl carbonate with bisphenol A) and other polycarbonates of the Lexan type, polyesters such as polyethylene terephthalate and polyamides and polyester amides of the nylon type, e.g., polymeric hexamethylene adipamide and the other polymers disclosed in Carothers Patent 2,071,250, irradiated polyethylene, e.g., irradiated to an extent of 2 to 25 megarep.

Some corrosive materials, e.g., hydrofluoric acid and acidic fluoride salts, have a tendency to attack glass. When such materials are to be transported in the tank, the inner shell 50 can be covered with a film of a corrosion resistant plastic 65, e.g., polyethylene, polypropylene, irradiated polyethylene, perfluoromonolefin polymers such as polytetrafluoroethylene, polychlorotrifluoroethylene, resinous polyoxymethylene, nylon, polycarbonates, polyurethanes, e.g., of the types set forth above, polystyrene, saran coated polyethylene, e.g., polyethylene coated on the side which will be in contact with the contents of the tanks with a vinylidene chloride-acrylonitrile copolymer (75:25).

In some instances where the contents of the vessel will attack fiber glass such as hydrofluoric acid and the acidic fluoride salts, e.g., ammonium fluoride, in place of utilizing a film of plastic to cover the fiber glass mat there can be used inert organic fibers to replace the fiber glass in the inner shell. Thus there can be used Orlon (acrylonitrile resin) fibers and Dynel (vinyl chloride acrylonitrile resin) fibers. Resin impregnated fiber glass should be used as the outer shell in such cases to provide adequate strength.

The insulation 54 can be made of any foamed elastic or plastic, e.g., foamed polystyrene, polyvinyl toluene, polyethylene, polypropylene, polyurethane, polydichlorostyrene, phenol-formaldehyde resin, urea-formaldehyde resin, polyvinyl chloride, natural rubber, synthetic rubber, e.g. butadiene-styrene copolymer, polyisoprene, epoxy resin, polyester or the like. The foamed polyurethanes, for example, can be made by foaming any of the polyurethanes set forth above in conventional fashion, either simultaneous with or subsequent to the formation of the polyurethane. The use of a phosphorus containing reactant in forming the polyurethane renders the foam more flame and fire resistant. Other structural insulating materials, such as balsa wood, can also be used.

In place of utilizing a laminate as shown in FIGURES 1, 3 and 4, there can be employed a single fiber glass reinforced plastic shell 58 as shown in FIGURE 5 for tanks which are used to transport materials not requiring an insulating layer. Such shell should also have the reinforcing ribs 64 to impart adequate strength, and the ribs may extend either outwardly or inwardly, the latter arrangement being shown in FIGURE 5.

The rear dome or end 26 and the front dome or end 56 are constructed of the same material as the rest of the tank and as indicated in FIGURES 1 and 3 include a continuation of annulus 54.

The main portion 60 of the tank excluding the appurtenances is of unitary construction and is preferably of generally cylindrical shape. The end pieces 26 and 56 can be formed simultaneously with the main portion 60 prior to the setting of the resin so that no adhesive is required. The shells 50 and 52 thus can be made completely of unitary construction.

The foamed annulus 54 can be preformed and positioned between the inner and outer shells of the cylinder 60 and the ends 26 and 56 in any suitable manner. Alternatively, the foam can be formed in place in the cylinder and the ends, particularly if a polyurethane foam is employed. The foam can be blown into the annulus 54 through holes in the skin 52 and the holes then sealed with the fiber glass plastic material.

While the fiber glass which is impregnated with the plastic can be of non-woven mat configuration, preferably it is at least in part the form of a woven mat.

Since fiber glass reinforced plastics have a low modulus, it is surprising that they can be used to make tanks designed to carry heavy pay loads. However, by making the tank of generally cylindrical construction (or of elliptical shape) and including the ribs, it has been found that the section modulus is such that taken with the high strength of the fiber glass reinforced plastic it is possible to make a chassisless tank of extremely light weight which will carry heavy pay loads.

The sandwich construction described in connection with FIGURE 4 has the combined advantage of high section modulus and good thermal insulation. It may be noted that in some instances the outer shell 52 can be eliminated and the foam layer, preferably with an impervious skin of the same (or different plastic) will serve as the outer layer.

While the proportion of plastic to glass fibers is not critical, usually the plastic will be 25 to 65% by weight of the mixture. In the illustrative example, the foam layer 54 was 2½ inches thick, the shell 52 was ¼ inch thick and the shell 50 was ¼ inch thick.

It has been found that the tanks of the present invention combine high impact strength with low rates of heat transfer and non-flammable characteristics to provide maximum over-the-road safety.

Since normally no special lining is required as the fiber glass reinforced plastic is corrosion resistant to virtually all materials throughout its thickness, there is an additional initial savings.

In the claims where reference is made to the capacity of the tank in gallons, the capacity is determined in gallons of water as measured in the United States.

The tank trailer which has just been described is of a unique plastic shell construction in which the tank member serves as its own stiffening and structural supporting member resting upon and stretching between a pair of cradles, one of which includes at least one axle member mounting suitable wheel means, the other being adapted to rest upon and be engaged by the rear supporting member of a motorized tractor. Such a construction permits a low initial cost of fabrication, decreased maintenance costs, and increased loads because of the lighter weight of the shell construction. Due to its high impact strength and comparatively low rate of heat transfer characteristics, the tank trailer herein described provides a higher safety coefficient than was heretofore obtainable with the employment of all metal containers or tank members. Furthermore, the plastic shell construction is corrosive resistant and is therefore applicable to haul a variety of products whether they be food, petroleum, or other chemicals. Plastic shell tank trailers of the type described herein are pleasing in appearance and are easily cleaned, a characteristic which is especially important in building customer confidence in the product and in the company which transports the product.

While the form of the invention described herein constitutes a preferred embodiment of the invention, it will be understood that the invention is not limited to this form of apparatus but that various changes may be made therein without departing from the scope of the invention which is defined in the appended claims.

We claim:

1. In combination with a tractor, a mobile tank of chassisless construction comprising: first cradle means; second cradle means spaced from said first cradle means; tank means extending between and supported upon said first and second cradle means, said tank means being substantially cylindrical in shape and of three layer plastic construction including a unitary inner corrosion resistant fiber glass reinforced thermosetting plastic shell member, a unitary outer high strength fiber glass reinforced thermosetting plastic shell member, and an insulating plastic layer interposed between said inner and outer shell members; reinforcing ribs of fiber glass reinforced thermosetting plastic completely encircling said inner shell and extending through said insulating layer and uniting said shells to each other, each of said first and second cradle means being connected to said tank at at least one of said ribs, said shells being free of reinforcing structure other than said ribs; wheel means associated with and supporting each of said cradle means; and means detachably connecting said tank means to said tractor for transit therewith.

2. A combination as in claim 1 further comprising a thin continuous lining of hydrofluoric-acid-insoluble plastic material covering the inner surface of the inner shell.

3. A generally cylindrical tank suitable for use as a chassisless tank trailer and having a capacity of at least 1000 gallons, said tank having sufficient strength to be supported on a pair of cradles located at or near its ends, the tank being of plural shell construction, said shells including a unitary inner corrosion-resistant thin plastic shell enclosed by an outer thin plastic shell, one of said shells being reinforced with fiberglass; an insulating foam polymer layer interposed between the inner and outer shells and a plurality of ring-like ribs of fiberglass reinforced plastic material extending through said insulating foam polymer and uniting the inner and outer shells to one another.

4. A tank as in claim 3 wherein the outer shell is composed of fiberglass reinforced polyester.

5. A tank as set forth in claim 3 wherein the inner shell is composed of fiberglass reinforced polyester.

6. A tank as set forth in claim 3 wherein the inner shell is composed of organic fiber reinforced plastic material, said shell being substantially insoluble in hydrofluoric acid.

7. A tank as set forth in claim 3 additionally comprising a thin lining of hydrofluoric acid insoluble material covering the inner surface of the inner shell.

8. A tank as set forth in claim 7 wherein said inner shell lining is composed of polypropylene.

References Cited by the Examiner

UNITED STATES PATENTS

| 1,373,434 | 4/21 | Kramer | 280—5 |
| 2,727,286 | 12/55 | Moore | 220—81 X |
| 2,728,702 | 12/55 | Simon et al. | |
| 2,823,826 | 2/58 | Moore | 220—67 X |
| 2,962,323 | 11/60 | McBride | 296—31 X |
| 3,013,922 | 12/61 | Fisher. | |
| 3,043,599 | 7/62 | Meyer | 280—5 |
| 3,080,267 | 3/63 | Schmalz. | |
| 3,082,899 | 3/63 | Squier et al. | 220—9 X |
| 3,100,458 | 8/63 | Baker et al. | 105—397 |

FOREIGN PATENTS

| 228,746 | 5/60 | Australia. |
| 628,313 | 10/61 | Canada. |

OTHER REFERENCES

British Oxygen Co. Ltd., Great Britain, 796,450, June 11, 1958.

Grundstuck Muller and Co., Germany, 1,072,218, Dec. 31, 1959.

Article, "Latest Development in Plastic Trailers," from "Automotive Industries" of Jan. 1, 1954, pp. 64, 65, 122.

"Glass-Resin Tank Cuts Car Weight" in "Railway Locomotives and Cars," May 1963, pages 41–42.

A. HARRY LEVY, *Primary Examiner.*

PHILIP ARNOLD, *Examiner.*